United States Patent
Kim

(10) Patent No.: US 6,654,609 B2
(45) Date of Patent: Nov. 25, 2003

(54) METHOD FOR MEASURING LOCATION OF MOBILE STATION AND FOR PERFORMING HANDOFF USING THE SAME IN MOBILE COMMUNICATION SYSTEM

(75) Inventor: Dong-Hun Kim, Ichon-shi (KR)

(73) Assignee: Hyundai Electronics Industries Co., Ltd. (KR)

(*) Notice: Subject to any disclaimer, the term of this patent is extended or adjusted under 35 U.S.C. 154(b) by 557 days.

(21) Appl. No.: 09/731,894

(22) Filed: Dec. 1, 2000

(65) Prior Publication Data

US 2001/0041570 A1 Nov. 15, 2001

(30) Foreign Application Priority Data

Dec. 2, 1999 (KR) ........................................ 1999-54434

(51) Int. Cl.[7] ................................................. H04Q 7/20
(52) U.S. Cl. ..................... 455/437; 455/456.1; 370/331
(58) Field of Search ................................. 455/436, 439, 455/442, 437, 404.2, 414.2, 440, 456.1, 457; 370/331

(56) References Cited

U.S. PATENT DOCUMENTS

| | | | |
|---|---|---|---|
| 6,081,717 A | 6/2000 | Shah et al. | 455/446 |
| 6,564,057 B1 * | 5/2003 | Chun et al. | 455/437 |
| 6,577,866 B1 * | 6/2003 | Roberts | 455/436 |
| 6,584,087 B1 * | 6/2003 | Czaja et al. | 370/335 |
| 6,594,492 B2 * | 7/2003 | Choi et al. | 455/436 |
| 6,597,927 B1 * | 7/2003 | Eswara et al. | 370/334 |

* cited by examiner

Primary Examiner—Nguyen T. Vo
Assistant Examiner—Nghi H. Ly
(74) Attorney, Agent, or Firm—Baker Botts LLP

(57) ABSTRACT

A method for measuring a location of a mobile station in a mobile communication system includes the steps of: when the mobile station is requested of a pilot strength measurement message (PSMM) by a base station or a handoff is occurred, measuring strengths of pilot channel signals of both an activated set of base stations and a neighbor list set of base stations in specific areas within each sector of each base station; transmitting the PSMM to the base station; comparing the PSMM, in sequence, with strengths of the pilot channel signals from specific areas covered by an activated set of the base stations and a neighbor list set of the base stations which are previously stored in a database; and according to a comparison result acquired from the step c), measuring the location of the mobile station.

3 Claims, 2 Drawing Sheets

METHOD FOR MEASURING LOCATION OF MOBILE STATION AND FOR PERFORMING HANDOFF USING THE SAME IN MOBILE COMMUNICATION SYSTEM

FIELD OF THE INVENTION

This invention relates to a mobile communication system; and more particularly, to a method for measuring a location of a mobile station and a method for performing a handoff using the same in a mobile communication system.

DESCRIPTION OF THE PRIOR ART

In a code division multiple access (CDMA) mobile communication system, when a mobile station is powered-on, the mobile station performs a synchronization with a CDMA channel for communicating with a base station (BS) begins a search for the pilot channel.

After the mobile station acquires the pilot channel, the mobile station adjusts timing to a corresponding system, using a synchronous channel. Here, the pilot channel of each base station has a different pseudo noise (PN) offset.

When the mobile station, moves from an area that a current BS covers to an area that a new BS covers, in an idle state, it senses another pilot channel signal having a large strength from a sector of the new BS, except for the pilot channel signal from the current BS. If the strength of another pilot channel signal of the new BS is equal to or higher than a predetermined threshold value, the mobile station transmits a pilot strength measurement message (PSMM) relating to the pilot channel signal from the sector of the new BS, to the current BS through a reverse traffic channel.

The current BS establishes a new activated set of the PN offset, based on the PSMM received from the mobile station and if a condition of the handoff is satisfied, then performs a handoff to the new BS.

As can be seen above, to select an activated BS in the conventional way, the strength of the pilot channel signal of base stations each having a different PN offset is used. The pilot channel signal is received from the current BS or the neighboring BS. According to the conventional way, the handoff is performed based on the strength of the pilot channel signal of the base stations each having the different PN offset.

In this case, due to an obstacle of geographical features such as buildings, when the mobile station receives a signal transmitted from a BS geographically close to the mobile station, the strength of which is weaker than that of a signal transmitted from a BS geographically relatively far from the mobile station, the mobile station doesn't performs the handoff to the close BS but the far BS having a good radio environment. However, after passing the above geographical obstacle, the mobile station performs a handoff to the close BS again.

At this time, while repeating a frequent swap and the handoff, there is a high possibility that a call may be dropped, to thereby provide a problem that a quality of a phone call in an overall system may go down.

SUMMARY OF THE INVENTION

It is an object of the present invention to provide a method for measuring a location of a mobile station in a mobile communication system.

It is another object of the present invention to provide a method for performing a handoff using the method for measuring the location of the mobile station in a mobile communication system.

In accordance with an aspect of the present invention, there is provided a method for measuring a location of a mobile station in a mobile communication system, the method comprising the steps of: a) when the mobile station is requested of a pilot strength measurement message (PSMM) by a base station or a handoff is occurred, measuring strengths of pilot channel signals of both an activated set of base stations and a neighbor list set of base stations in specific areas within each sector of each base station; b) transmitting the PSMM to the base station; c) comparing the PSMM, in sequence, with strengths of the pilot channel signals of an activated set of the base stations and a neighbor list set of the base stations which are previously measured and stored in a database; and d) according to a comparison result acquired from the step c), measuring the location of the mobile station.

In accordance with another aspect of the present invention, there is provided a method for performing a handoff in a mobile communication system, wherein a mobile station is located in a desired one of 3 sectors in a cell covered by a base station, i.e., an alpha sector, a beta sector, and a gamma sector, however, a strength of a signal from an undesired sector is larger than that from the desired sector due to an obstacle in the desired sector, the method comprising the steps of: a) when the mobile station is requested of a pilot strength measurement message (PSMM) from a base station or a handoff is occurred, measuring strengths of pilot channel signals of an activated set of base stations and a neighbor list set of base stations in specific areas within each sector of each base station; b) transmitting the PSMM to the base station; c) comparing the PSMM, in sequence, with strengths of the pilot channel signals of an activated set of the base stations and a neighbor list set of the base stations which are previously stored in a database; d) according to a comparison result acquired from the step c), measuring the location of the mobile station; and e) disregarding the handoff to the undesired sector, based on the PSMM and the location of the mobile station measured at the step d).

In accordance with further another aspect of the present invention, there is provided a method for performing a handoff in a mobile communication system, wherein a mobile station is located in an overlapped area where an alpha sector and a beta sector, the beta sector and a gamma sector, or the alpha sector and the gamma sector are overlapped within a base station covering 3 sectors of an alpha sector, a beta sector, and a gamma sector, however, a strength of a signal from an undesired sector is larger than those from the other 2 sectors due to an obstacle in the overlapped area, the method comprising the steps of: a) when the mobile station is requested of a pilot strength measurement message (PSMM) from a base station or a handoff is occurred, measuring strengths of pilot channel signals of an activated set of base stations and a neighbor list set of base stations in specific areas within each sector of each base station; b) transmitting the PSMM to the base station; c) comparing the PSMM, in sequence, with strengths of the pilot channel signals of an activated set of the bas stations and a neighbor list set of the base stations which are previously stored in a database; d) according to a comparison result acquired from the step c), measuring the location of the mobile station; and e) disregarding the handoff to the undesired sector in the overlapped area where two sectors are overlapped, based on the PSMM and the location of the mobile station measured at the step d).

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
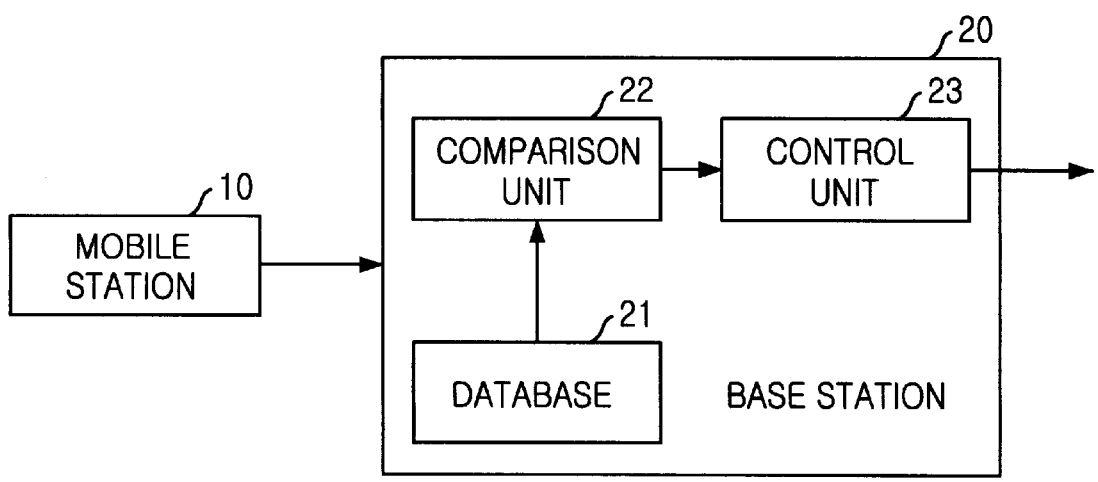
FIG. 1 shows a block diagram illustrating a mobile communication system in accordance with the present invention.

FIG. 1 shows a block diagram illustrating roughly a mobile communication system in accordance with the present invention.

As shown in FIG. 1, the mobile communication system includes a mobile station 10 and a base station 20. The mobile station 10 serves to transmit a pilot strength measurement message (PSMM) via a traffic channel.

The base station 20 includes a database 21, a comparison unit 22, and a control unit 23. In the data base 21, strengths of pilot channel signals from an activated set and a neighbor list set of base stations, which are measured in a location of the mobile station, are stored using the PSMM transmitted from the mobile station.

The comparison unit 22 compares the above signal strength of the pilot channel with strengths of pilot channel signals from an activated set and a neighbor list set of base stations which are stored in the database 21, and then outputs a signal of the comparison result.

The control unit 23 measures a location of the mobile station 10, based on the signal of the comparison result which is outputted from the comparison unit 22 and performs a handoff to an most appropriate base station or disregards the handoff, based on the measured location of the mobile station and the PSMM transmitted from the mobile station 10.

Figure 2:
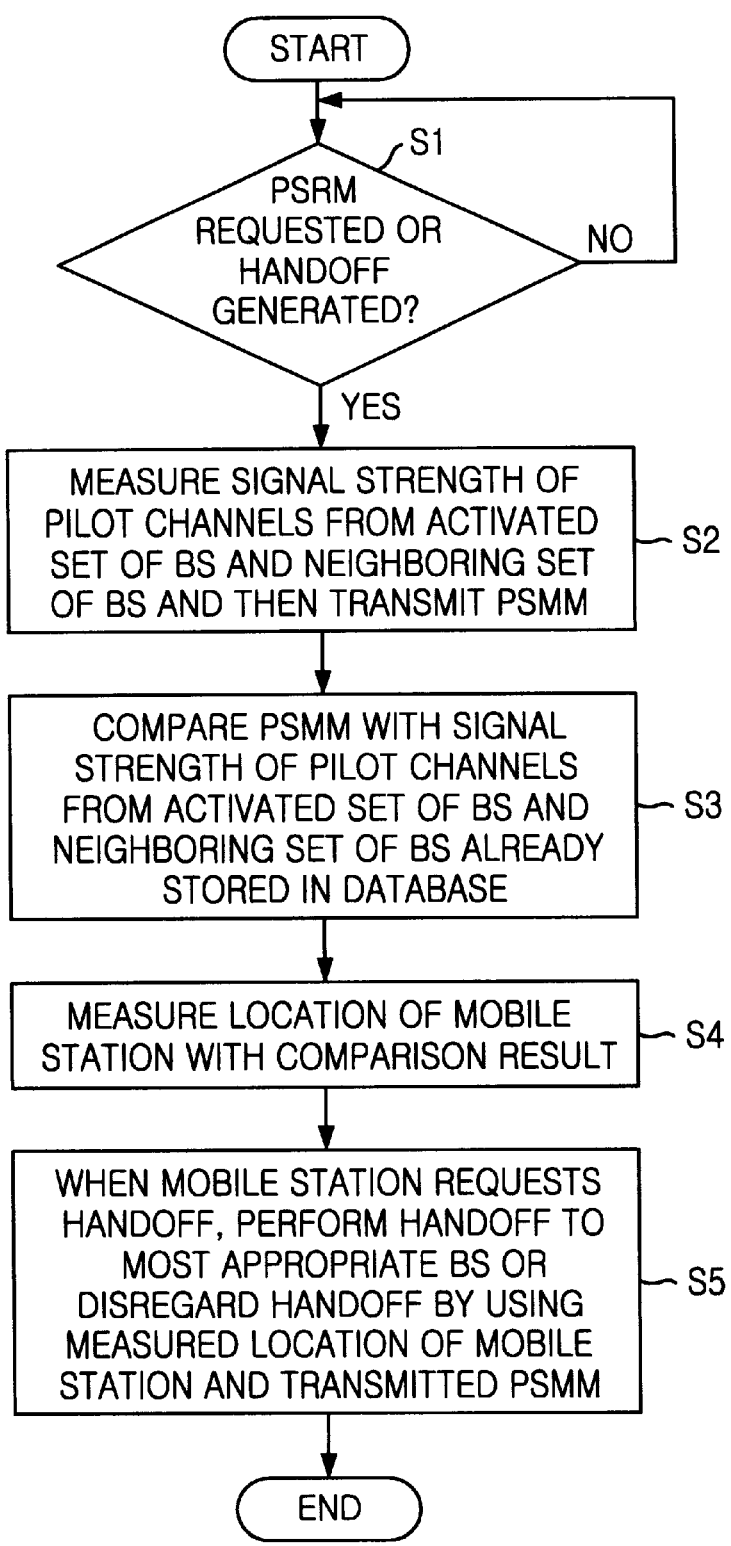
FIG. 2 is a flow chart representing a method for measuring a location of a mobile station and a method for performing a handoff using the same in the mobile communication system in accordance with the present invention.

FIG. 2 shows a flow chart representing a method for measuring a location of a mobile station and a method for performing a handoff using the same in accordance with the present invention.

Referring to FIG. 2, a method for measuring a location of a mobile station in a mobile communication system in accordance with one embodiment of the present invention will be described hereinafter.

At step S1, when the base station 20 requests the mobile station 10 of the PSMM, it transmits a pilot measurement request message (PSRM) to the mobile station 10. In case the mobile station 10 receives the PSRM from the base station 20 or the handoff is occurred, at step S2, it measures strengths of pilot channels from an activated set and a neighbor list set of base stations in every specific place within each sector of every base station and transmits the PSMM to a corresponding base station.

At step S3, the comparison unit 22 of the base station 20 compares the PSMM transmitted from the mobile station, in sequence, with the signal strength of the pilot channels included in each of the activated set and the neighbor list set that are already stored in a database.

At step S4, the control unit 23 of the base station 20 measures the location of the mobile station, according to a comparison result.

A method for performing a handoff in a mobile communication system in accordance with another embodiment of the present invention will be described hereinafter.

A mobile station is located in a desired one of 3 sectors in a cell covered by a base station, i.e., an alpha sector, a beta sector, and a gamma sector, however, a strength of a signal from an undesired sector is larger than that from the desired sector due to an obstacle in the desired sector.

When the handoff is occurred in the desired sector, steps S1 to S4 are the same as the steps S1 to S4 in the above embodiment for measuring the location of the mobile station in the mobile communication system in accordance with the one embodiment of the present invention. Additionally, at step S5, the base station disregards the handoff to a corresponding area which is the undesired sector by using the PSMM transmitted at the step S2 and the location of the mobile station measured at the step S4.

Finally, a method for performing a handoff in a mobile communication system in accordance with further another embodiment of the present invention will be described hereinafter.

The mobile station is located in an overlapped area where an alpha sector and a beta sector, the beta sector and a gamma sector, or the alpha sector and the gamma sector are overlapped within a base station covering 3 sectors of an alpha sector, a beta sector, and a gamma sector, however, a strength of a signal from an undesired sector is larger than those from the other 2 sectors due to an obstacle in the overlapped area.

When the handoff is occurred in the overlapped area, steps S1 to S4 are the same as the steps S1 to S4 in the above embodiment for measuring the location of the mobile station in the mobile communication system in accordance with the one embodiment of the present invention. Additionally, at step S5, the base station disregards the handoff to the undesired sector by using the transmitted PSMM and the location of the mobile station measured at the step S4.

As can be seen from the present invention described above, since the base station finds out the location of the mobile station, the handoff can be performed more efficiently.

Also, by performing the handoff more exactly, probability of the successful handoff can be higher, so that reliability of the system can be increased.

Although the preferred embodiments of the invention have been disclosed for illustrative purpose, those skilled in the art will appreciate that various modifications, additions, and substitutions are possible, without departing from the scope and sprit of the invention as disclosed in the accompanying claims.

What is claimed is:

1. A method for measuring a location of a mobile station in a mobile communication system, the method comprising the steps of:
   a) when the mobile station is requested of a pilot strength measurement message (PSMM) by a base station or a handoff is occurred, measuring strengths of pilot channel signals of both an activated set of base stations and a neighbor list set of base stations in specific areas within each sector of each base station;
   b) transmitting the PSMM to the base station;
   c) comparing the PSMM, in sequence, with strengths of the pilot channel signals from specific areas covered by an activated set of the base stations and a neighbor list set of the base stations which are previously stored in a database; and
   d) according to a comparison result acquired from the step c), measuring the location of the mobile station.

2. A method for performing a handoff in a mobile communication system, wherein a mobile station is located in a desired one of 3 sectors in a cell covered by a base station, i.e., an alpha sector, a beta sector, and a gamma sector, however, a strength of a signal from an undesired sector is larger than that from the desired sector due to an obstacle in the desired sector, the method comprising the steps of:

a) when the mobile station is requested of a pilot strength measurement message (PSMM) from a base station or a handoff is generated, measuring strengths of pilot channel signals of an activated set of base stations and a neighbor list set of base stations in specific areas within each sector of each base station;

b) transmitting the PSMM to the base station;

c) comparing the PSMM, in sequence, with strengths of the pilot channel signals from specific areas covered by an activated set of the base stations and a neighbor list set of the base stations which are previously stored in a database;

d) according to a comparison result acquired from the step c), measuring the location of the mobile station; and e) disregarding the handoff to the undesired sector, based on the PSMM and the location of the mobile station measured at the step d).

3. A method for performing a handoff in a mobile communication system, wherein a mobile station is located in an overlapped area where an alpha sector and a beta sector, the beta sector and a gamma sector, or the alpha sector and the gamma sector are overlapped within a base station covering 3 sectors of an alpha sector, a beta sector, and a gamma sector, however, a strength of a signal from an undesired sector is larger than those from the other 2 sectors due to an obstacle in the overlapped area, the method comprising the steps of:

a) when the mobile station is requested of a pilot strength measurement message (PSMM) from a base station or a handoff is generated, measuring strengths of pilot channel signals of an activated set of base stations and a neighbor list set of base stations in specific areas within each sector of each base station;

b) transmitting the PSMM to the base station;

c) comparing the PSMM, in sequence, with strengths of the pilot channel signals from specific areas covered by an activated set of the bas stations and a neighbor list set of the base stations which are previously stored in a database;

d) according to a comparison result acquired from the step c), measuring the location of the mobile station; and e) disregarding the handoff to the undesired sector in the overlapped area where two sectors are overlapped, based on the PSMM and the location of the mobile station measured at the step d).

* * * * *